De W. C. Cumings,
Straw Cutter.
No. 847. Reissued Nov. 8, 1859.
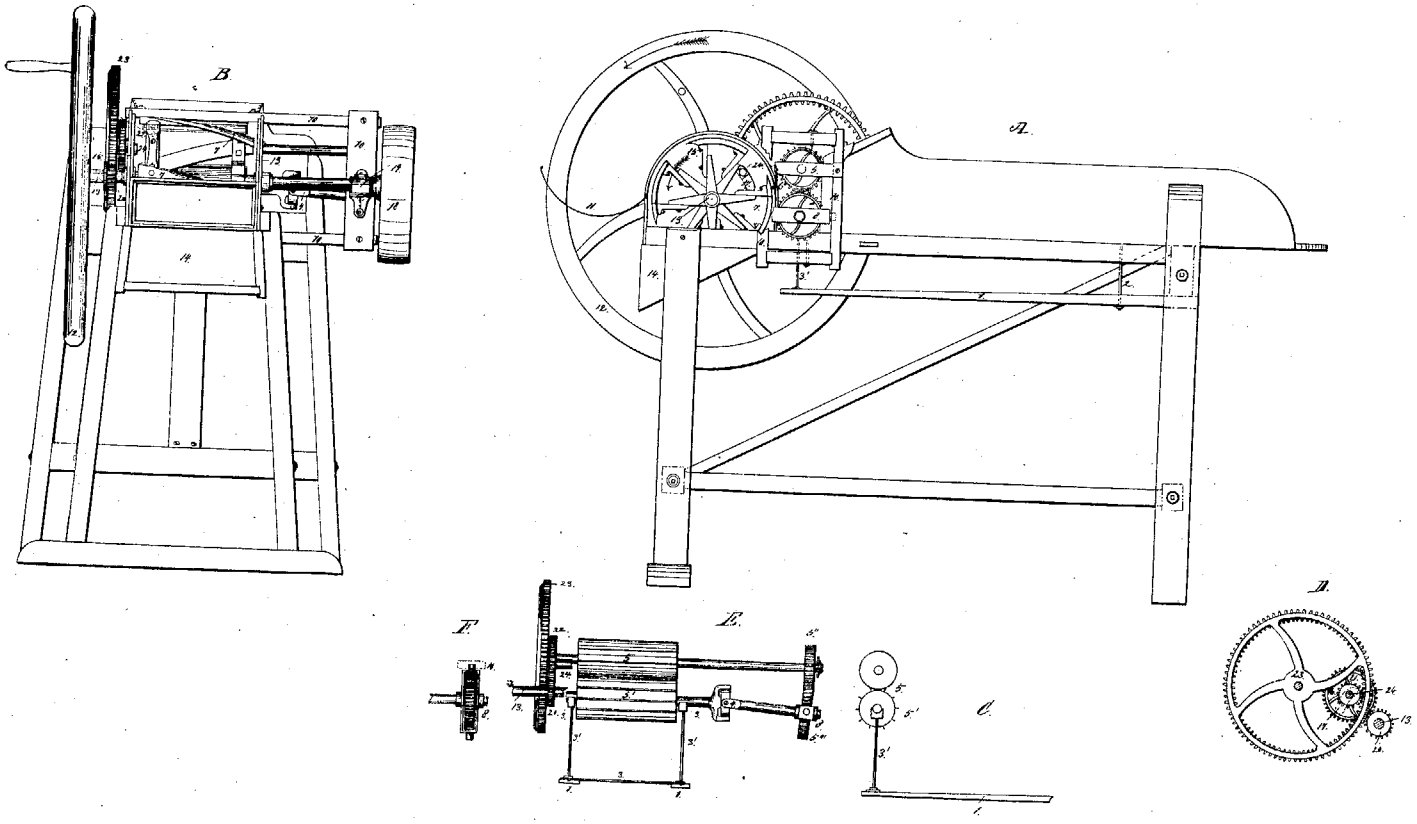
N. PETERS, PHOTO-LITHOGRAPHER, WASHINGTON, D. C.

UNITED STATES PATENT OFFICE.

DEWITT C. CUMINGS, OF FULTON, NEW YORK.

IMPROVEMENT IN STRAW-CUTTERS.

Specification forming part of Letters Patent No. 13,385, dated August 7, 1855; Reissue No. 847, dated November 8, 1859.

*To all whom it may concern:*

Be it known that I, DEWITT C. CUMINGS, of Fulton, in the county of Oswego and State of New York, have invented a certain new and useful Improvement in Machines for Cutting Hay or Straw or the like; and I do hereby declare that the following is a full, clear, and exact description thereof, reference being had to the accompanying drawings, which form part of this specification, and in which—

Figure A represents a side view of the cutting-machine, partly in elevation and partly in section. Fig. B represents an end view of the same; Fig. C, an end view of the feed-rollers and spring detached; Fig. D, a detached view of the gearing for operating the feed-rollers; Fig. E, a front view of the feed-rollers with all the gearing to operate them; and Fig. F, a plan of the lower gear-wheel, through which motion is communicated to the lower roller, showing the compensating method of hanging it.

The same letters of reference occurring in the several figures indicate the same parts.

The nature of my invention consists in operating the lower adjustable feed-roller by means of a spur-wheel hung in a vibrating frame or yoke, the axis of which is connected with the said roller by means of a universal coupling, when said roller is supported on spring-bearings independent of each other; and also in the employment of a cylinder provided with a knife or knives which have an upward cylindrical cut, when the same is arranged with two independent feed-rollers, the lower one of which being supported on a spring or springs from above or below in such a manner that it can adjust to act with greater or less pressure on the material to be cut, as is hereinafter described.

For the better understanding of the construction and operation of my machine, I will describe it by referring to the drawings.

I construct the framing and shoe or feed-box similar to that of the ordinary straw-cutter heretofore used. At or near the end of the horizontal framing is hung a shaft, 13, with a series of radial arms, usually four in number, at equal distance apart. At each end within the side plates 15 and to the extremities of these arms, obliquely at an angle of about twenty-five degrees from a line parallel with the shaft, are attached the knives 7, extending from end to end.

Thus far my cylindrical rotary cutter is similar to those heretofore in use, but it differs from them in the edges of the knives being set upward instead of downward, revolving in the direction indicated by the arrow, and by their oblique position effect a shearing cut on the straw or other material against the under side of the mouth-piece or cutting-plate 6, which is placed horizontally across the frame and parallel to the axis of the cylindrical knives, in close proximity to them. The reasons for and advantages to be derived from this mode of cutting are that all dry produce which is usually cut up to feed stock contains more or less dust and dirt, and by the variety of methods of cutting downward in feeding it to the cutters the dirt, &c., is separated from the vegetable matter and collects on the bottom of the feed-box, and is carried forward in mass under the knives and dulls them very quickly, and although once separated it is again mixed with the feed by discharging into the same receiver, and must be very injurious to the cattle, while by my invention the feed-rollers, in pressing the material between them, loosen the dirt, and on its passage from said rollers to the cutting-edges is allowed to spread, when it (the dirt) is liberated and falls beneath the machine through the opening beneath the roller, and by cutting upward no portion of it can collect on the mouth-piece or cutting-plate to come in contact with the edges of the knives, and nothing but clean cut feed is discharged into the receiver.

The feed arrangement consists of a roller, 5, hung in permanent journals in the frame 10, with a spur-wheel, 23, on one end of its axis and another spur-wheel, 5″, on the other end. The wheel 23 is constructed with both internal and external gear, and through which motion is communicated to the roller, either directly by gearing into the pinion 20 on the axis of the cutters or through the counter-wheel 22 and pinion 21, the counter-wheel gearing into the pinion 20 on the cutter-shaft, (to which said pinion is attached by a set-screw, so that it may be readily moved on the shaft to gear into the wheel 23 or the counter-wheel 22.) The pinion 21 on the same axis as the counter-wheel gears into the internal teeth of the wheel 23, and thus transmits its motion to the roller in the same direction as if the pinion 20 were directly in gear with the wheel 23, whereas if the pinion 21 on the counter-shaft geared into the external teeth of the wheel 23 it would move it in the contrary direction and require another intermediate wheel to turn it the right way. The stud 24 or axis of the counter-wheel and pinion is fitted in a curvilinear slot, 17, in the side plate, 15, so that its position may be changed to admit of different-sized pinions being used to vary the speed of the feed-rollers and consequently varying the length of the fragment cut.

Beneath the roller 5, and parallel with it, is a fluted or ribbed roller, 5′, of similar length and diameter, having its axis in pillar-boxes supported on springs 1, by which it is borne up against the fixed roller, one spring on either side, independent of each other, so that it may accommodate itself to the varying quantity of feed from side to side of the box. In order to communicate rotary motion to the axis of this roller, having motion in a vertical plane, and its ends not being at all times in a horizontal plane, it is necessary to provide it with a compensating-gear arrangement, which will remain at all times properly in gear with its propelling-wheel regardless of the varying position of the axis to be rotated. For this purpose the wheel 5‴, gearing into that on the axis of the upper feed-roller, is hung in a yoke, 8, pivoted at each end in the framing 10. The axis of this wheel is connected with the axis of the lower feed-roller by an universal joint, 4, which admits of the various change of position of said roller, while the wheel 5‴, being hung in the yoke, accommodates itself to such change of position.

With the ordinary feed apparatus, where the rollers are of equal diameter, the upper portion of the material to be cut, or that portion in contact with the smooth roller, has a tendency to slip; consequently there is no uniformity in the length of the material cut. To remedy this, I cause the periphery of the smooth roller to travel at a greater velocity, either by using a smaller wheel on its axis than that on the axis of the ribbed roller.

The springs 1 at their thicker ends bear against the under side of a cross-piece in the framing of the feed-box, and are supported by bolts 2 through them, with nuts on their under side, the thin ends of these springs bearing the pillar-boxes of the lower roller before described. These springs are capable of being adjusted to suit the material to be cut by screwing the nuts which support them up or down on the bolts 2. When hay or straw is to be cut, there is but little pressure required. By taking off the nuts which support them they may be turned the other side up, when they will be fully as stiff as at first.

When this machine is operated by hand, the man should stand with his left side to the feed-box, turning the balance-wheel 12 by the handle with his right hand in the direction of the arrow, and feeding the material to the rollers with his left. It may be worked by horse or any other power by a band over the pulley 18.

From the foregoing it will be seen that this machine is adapted to cleaning and cutting hay or straw.

Having thus described my invention, I wish to be understood that I do not claim the upward cut in itself, as that has been used before with the two-edged reciprocating knife, but

What I claim as new, and desire to secure by Letters Patent, is—

1. Operating the adjustable lower feed-roller by means of a spur-wheel hung in a vibrating frame or yoke, the axis of which is connected with the said roller by means of a universal coupling, when said roller is supported on spring-bearings independent of each other, substantially as and for the purpose specified.

2. The employment of a cylinder provided with a knife or knives which have an upward cylindrical cut, when the same is arranged with two independent feed-rollers, the lower one of which being supported on a spring or springs in such a manner that it can adjust to act with greater or less pressure on the material to be cut, substantially as set forth.

In testimony whereof I have hereunto set my hand before two subscribing witnesses this 23d day of March, 1859.

DEWITT C. CUMINGS.

Witnesses:
C. W. WADSWORTH,
S. S. MORRILL.